(12) United States Patent
Saur et al.

(10) Patent No.: US 7,728,470 B2
(45) Date of Patent: Jun. 1, 2010

(54) ELECTRIC MOTOR

(75) Inventors: Martin Saur, Salach (DE); Bernhard Merschroth, Ottersweier (DE); Andreas Schiel, Gernsbach-Lautenbach (DE)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 10/572,173

(22) PCT Filed: Oct. 11, 2004

(86) PCT No.: PCT/DE2004/002249

§ 371 (c)(1),
(2), (4) Date: Jan. 9, 2007

(87) PCT Pub. No.: WO2005/036715

PCT Pub. Date: Apr. 21, 2005

(65) Prior Publication Data

US 2007/0194640 A1    Aug. 23, 2007

(30) Foreign Application Priority Data

Oct. 10, 2003   (DE) ............................... 103 47 850

(51) Int. Cl.
H02K 11/00    (2006.01)
H02K 5/00     (2006.01)

(52) U.S. Cl. .............................. 310/71; 310/51; 310/89; 310/91

(58) Field of Classification Search ................... 310/71, 310/89, 51, 91; 248/638; H02K 5/00, 11/00
See application file for complete search history.

(56) References Cited

U.S. PATENT DOCUMENTS 3,518,616 A * 6/1970 Lewis ......................... 439/470
4,690,366 A * 9/1987 Loup .......................... 248/676
4,851,725 A * 7/1989 Keck ........................... 310/71
4,864,176 A * 9/1989 Miller et al. ................. 310/194
4,933,582 A * 6/1990 Hata et al. .............. 310/154.14
5,006,748 A * 4/1991 Wintermute .......... 310/216.039
5,530,304 A * 6/1996 Mirumachi et al. ........... 310/51
5,777,409 A * 7/1998 Keck ........................... 310/71
5,914,550 A * 6/1999 Periyathamby et al. ....... 310/91

(Continued)

FOREIGN PATENT DOCUMENTS

DE    43 34 124    9/1994

(Continued)

OTHER PUBLICATIONS

Patent Abstracts of Japan, Bd. 006, Nr. 060, Apr. 17, 1982 and JP 57 003548 (Hitachi Ltd.), Jan. 9, 1982.

(Continued)

*Primary Examiner*—Quyen Leung
*Assistant Examiner*—John K Kim
(74) *Attorney, Agent, or Firm*—Kenyon & Kenyon LLP

(57) ABSTRACT

An electric motor, e.g., a fan motor for an air conditioning fan of a motor vehicle, includes a receiving housing serving as a motor housing, which has a receiving opening into which the electric motor at least partially extends, as well as including connection elements for supplying power to the electric motor, and attachment means for the electrical connection elements. The attachment for the electrical connection elements is provided on the electric motor.

13 Claims, 5 Drawing Sheets

U.S. PATENT DOCUMENTS

| | | | |
|---|---|---|---|
| 5,917,258 A * | 6/1999 | Kershaw et al. | 310/51 |
| 5,945,756 A * | 8/1999 | Periyathamby et al. | 310/89 |
| 5,969,447 A * | 10/1999 | Periyathamby et al. | 310/89 |
| 6,171,079 B1 * | 1/2001 | Gross et al. | 417/423.12 |
| 6,262,504 B1 * | 7/2001 | Bartlett | 310/89 |
| 6,717,299 B2 * | 4/2004 | Bacile et al. | 310/51 |
| 6,731,036 B2 * | 5/2004 | Ghiotto | 310/89 |
| 6,740,992 B2 * | 5/2004 | Nadeau et al. | 310/51 |
| 7,109,618 B2 * | 9/2006 | Cha | 310/71 |
| 7,175,398 B2 * | 2/2007 | Kinmartin et al. | 417/423.14 |
| 2003/0080635 A1 * | 5/2003 | Bacile et al. | 310/51 |
| 2003/0155822 A1 * | 8/2003 | Nadeau et al. | 310/51 |
| 2004/0169428 A1 * | 9/2004 | Sano et al. | 310/89 |
| 2004/0201295 A1 * | 10/2004 | Hama et al. | 310/71 |
| 2006/0125330 A1 * | 6/2006 | Winkler et al. | 310/51 |
| 2007/0001522 A1 * | 1/2007 | Nitzsche | 310/51 |

FOREIGN PATENT DOCUMENTS

| | | |
|---|---|---|
| DE | 60032322 | 6/2008 |
| EP | 1 107 432 | 6/2001 |
| EP | 167 3847 | 6/2006 |
| JP | 570 03 548 | 1/1982 |
| JP | 5-219683 | 8/1993 |
| JP | 2001197702 | 6/2008 |
| WO | WO 2004/008293 | 1/2004 |

OTHER PUBLICATIONS

Correspondence dated Jul. 13, 2007 between Robert Bosch GmbH and the European Patent Office, relating to correspondence European Patent Application No. 04789955.4-2214.

Correspondence dated Oct. 31, 2006 between Robert Bosch GmbH and the European Patent Office, relating to corresponding European Patent Application No. 04789955.4-2214.

Office Action dated Mar. 22, 2007 issued by the European Patent Office in corresponding European Patent Application No. 04789955.4-2214.

* cited by examiner

ELECTRIC MOTOR

FIELD OF THE INVENTION

The present invention relates to an electric motor, and relates in particular a fan motor for an air conditioning fan of a motor vehicle.

BACKGROUND INFORMATION

In a wide range of electric motor applications, the motors are provided in a receiving housing serving as a motor housing which is then used to further attach the electric motor. This receiving housing is also used to decouple motor vibrations. For example, fan motors for heating and air conditioning systems which are typically used in motor vehicles are usually vibration-decoupled with respect to the vehicle. The goal is to limit the transmission of structure-borne noise from the electric motor or fan unit to the vehicle body and thus to the passenger compartment.

According to common methods for mounting motors of this type, the electric motor is introduced, for example, into a receiving housing serving as a motor housing, elastic isolation means being provided between the electric motor and the receiving housing so that it is possible to decouple the motor vibrations from the motor housing and thus, for example, from a vehicle body. A flange for securely connecting the motor to the air conditioning system, for example via a carrier part formed on the body, is typically provided on the motor mount itself.

Published German patent document DE 43 34 124 describes a device for accommodating an electric motor which achieves an especially low-vibration and thus noise-damping effect by providing, between the inner walls of this receiving device and the outer walls of the motor housing facing the device, at least one elastic damping element which is supported on the walls of the receiving device and the motor housing facing each other.

Another critical point relating to the transmission of the structure-borne noise generated by the electric motor to the motor housing and thus to the vehicle body is the plug-and-socket connection typically used for supplying electric power to the electric motor. The motor is provided with an integrated plug-and-socket connection. Because the motor is completely enclosed by the motor mount, the cable connection for supplying power is produced by a plug that is typically latched to the motor housing from the outside. The mechanical latching system is used to absorb the cable or plug extraction forces occurring during fan assembly and operation.

An air conditioning fan motor as well as a receiving housing in which a plug element for supplying electric power to the driving motor is passed through the receiving housing is described in published International patent document WO 00/48 293. The corresponding opening in the receiving housing of the electric motor is just large enough to insert the connecting plug element in a form-locked manner through this receiving opening. The system according to WO 00/48 293 thus prevents air taken in between the plug element and the receiving housing for the electric motor from exiting the fan. WO 00/48 293 also proposes to insert, between the plug element and the receiving housing, a sealing element which attaches the plug to the receiving housing and also prevents undesirable exiting of air at this point.

An object of the present invention is to prevent noises and vibrations generated by the electric motor from being coupled into the motor housing, or to substantially dampen them in their penetration.

SUMMARY

The electric motor according to the present invention has a receiving housing serving as a motor housing, including a receiving opening into which the electric motor at least partially extends. Connection means for supplying power to the electric motor and attachment means for the electrical connection means are also provided. According to the present invention, the electric motor is configured so that the electrical connection means are attached to the electric motor.

In this manner, it is possible to largely decouple from the motor housing the vibrations generated by the electric motor and transmitted via the plug element. Attaching the connection means directly to the motor interrupts a vibration bridge to the motor mount, i.e., to the receiving housing serving as the motor housing, thus preventing the operating vibrations of the motor/plug unit from being transmitted to the air conditioning housing.

To reduce the coupling of the vibrations transmitted to the plug element into the motor housing, the attachment of the electrical connection means is formed on the motor housing, in particular without the use of attachment means. This avoids direct contact between the plug element and the motor housing, so that a vibration bridge is not produced between the motor and the motor housing by the connection means.

The connection means advantageously have an interconnectable plug and plug receptacle. The plug receptacle is formed on the electric motor, and the plug is attachable to the electric motor. It is especially advantageous if the plug receptacle is formed in the area of a bearing bracket of the electric motor. For the secure electric contacting of the electric motor, the plug of the electrical connection elements may be latched to the electric motor. Latching the plug directly to the motor interrupts the vibration bridge to the motor housing, preventing operating vibrations of the driving motor from being transmitted, e.g., to the air conditioning housing. Latching it directly to a bearing bracket of the electric motor makes it possible to produce a mechanically secure connection between the motor and the plug of the connection elements.

For the purpose of secure contacting, the plug has at least one spring-elastic latching element that is latchable to the electric motor and, e.g., to a bearing bracket of the electric motor. The plug advantageously has at least two latching hooks. Based on a latching system of this type, the motor design may remain largely unchanged since no additional attachment measures are required, and a mechanically secure connection may nevertheless be established between the electric motor and the electrical connection elements.

Using an electric motor according to the present invention enables a fan, e.g., an air conditioning fan for the heating and air conditioning system of a motor vehicle, to be implemented which makes it possible to prevent operating vibrations of the driving electric motor from being transmitted to the resonant body of the air conditioning system, so that the generation of disturbing noise is avoidable. The electric motor according to the present invention advantageously makes it possible to largely prevent noises and vibrations generated by the motor from being coupled into the air conditioning system and therefore into the vehicle body. In particular, it is possible to largely dampen vibrations which are transmitted from the electric motor to the motor housing via electrical connection means.

DETAILED DESCRIPTION

Figure 1:
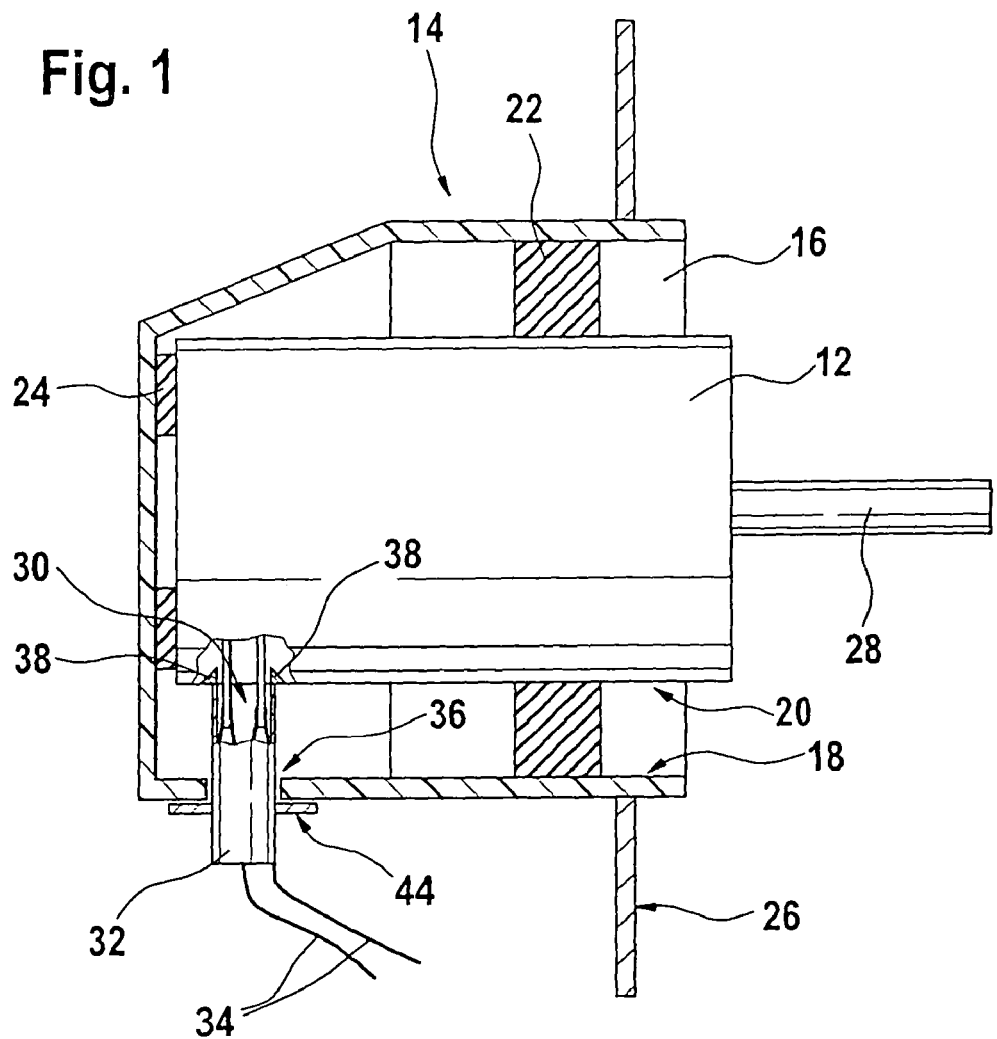
FIG. 1 shows a schematic cross-sectional view of a longitudinal section of an electric motor according to the present invention, having a motor housing.

FIG. 1 shows an electric motor 12, having a receiving housing 14 serving as a motor housing and including a receiving opening 16. Motor housing 14 has a largely pot-shaped design so that electric motor 12 is insertable into motor housing 14 through receiving opening 16.

Elastic damping elements 22 and 24, respectively, are provided between inner wall 18 of motor housing 14 and outer wall 20 of electric motor 12, which may be formed, for example, by the terminal housing of the electric motor. These damping elements 22 and 24 are used to dampen vibrations of the electric motor in relation to motor housing 14. The damping elements are typically made of an elastic material, such as rubber. Motor housing 14, and thus electric motor 12, may be fastened to a mounting part of, for example, an air conditioning system, via a flange-like system 26. This makes it possible, for example, to use the electric motor to drive a fan wheel of a heating and/or air conditioning system of a motor vehicle, which is not illustrated in FIG. 1. In this case, a corresponding fan wheel is mounted on shaft 28 of electric motor 12, and motor housing 14 is mounted via its flange area 26 in the air conditioner box of the motor vehicle.

For power supply purposes, electric motor 12 has plug-in contacts 30 onto which a corresponding electrical connection element such as a plug 32 may be positioned. A plug 32 of this type is then connected, for example, to the electrical system of a motor vehicle via corresponding connection means 34. The electrical connector plug is inserted through an opening 36 in motor housing 14 and attached directly to the electric motor via latching elements 38. In particular, plug 32 is attached to the electric motor without the use of fastening means mounted on motor housing 14. Attaching plug 32 directly to motor 12 in this manner prevents the possibility of a vibration bridge to motor housing 14 forming, thus preventing operating vibrations of the motor from being transmitted via the plug to motor housing 14 and thus, for example, to the air conditioning system. To avoid a vibration bridge of this type, a correspondingly large opening 36 through which plug 32 is insertable without establishing a vibration contact between plug element 32 and motor housing 14 is provided in motor housing 14 according to the exemplary embodiment shown in FIG. 1. To prevent air from flowing though opening 36 in motor housing 14, plug element 32 in the exemplary embodiment according to FIG. 1 has a plate-shaped collar 44 that covers opening 36 in motor housing 14.

Figure 2:
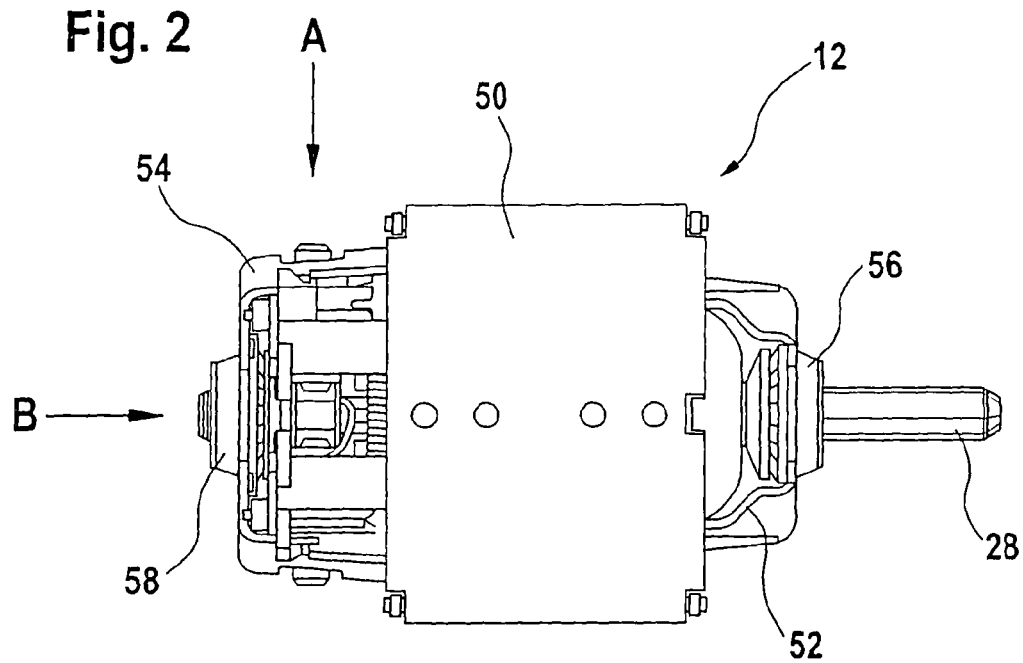
FIG. 2 shows a view of a further exemplary embodiment of an electric motor according to the present invention.

FIG. 2 shows a detailed view of an electric motor 12 according to the present invention.

Figure 3:
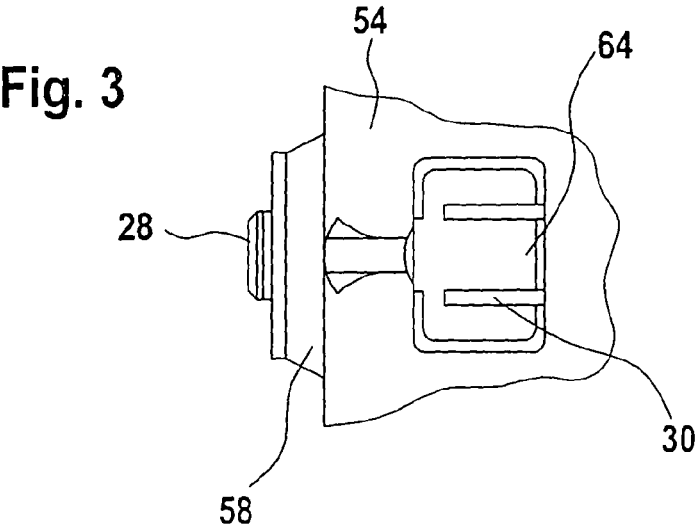
FIG. 3 shows a detailed view of the electric motor shown in FIG. 2.

Electric motor 12 has a terminal housing 50 which is simultaneously used as a carrier for two bearing brackets 52 and 54 for bearings 56 and 58, respectively, of shaft 28 of the electric motor. The electric contacting of the electric motor according to the present invention is provided in the area of drive-side bearing bracket 54. As shown in FIG. 3, which is a detailed representation of a top view along direction A shown in FIG. 2, bearing bracket 54 has a recess 64 that is designed as a plug socket, into which corresponding connection means such as a plug 32 may be plugged and which are contactable by contact pins 30 of the electric motor.

Figure 4:
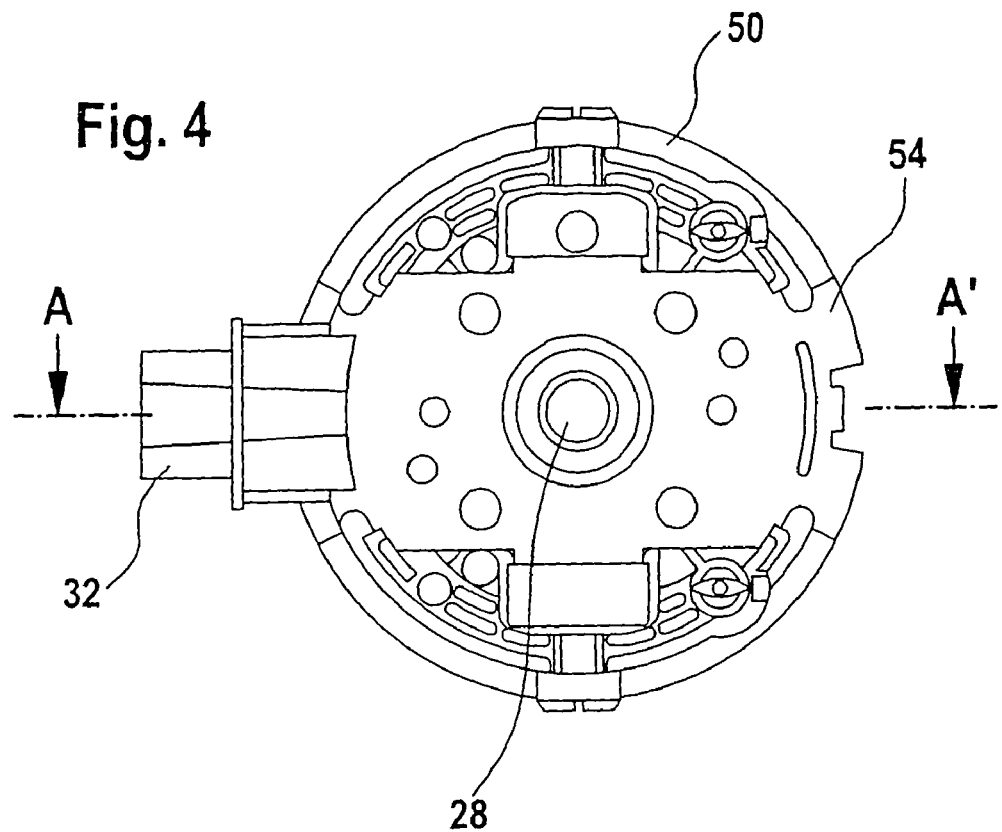
FIG. 4 shows a top view of an exemplary embodiment of an electric motor according to the present invention in the area of its drive-side bearing bracket, viewed in direction B shown in FIG. 2.

FIG. 4 shows a top view of the drive-side end of the electric motor shown in the present invention as viewed along direction B shown in FIG. 2, in which connection means in the form of a plug 32 are inserted. As shown in FIG. 4, and as illustrated by a cross-section of FIG. 5 taken along line A-A' of FIG. 4, plug 32 passes through bearing bracket 54 and is attached by corresponding latching elements 60 to the bearing bracket and thus to electric motor 12. Latching plug 30 directly to motor 12 or its bearing bracket 24 makes it possible to prevent a vibration bridge to the motor mount into which the electric motor is inserted according to FIG. 1. The latching to motor 12 is advantageously carried out directly on bearing bracket 54 without using any attachment means on the motor housing, so that a mechanically secure connection may be established between the motor and the plug without electrical connection means acting as a vibration bridge between electric motor 12 and motor housing 14 accommodating the electric motor.

Figure 5:
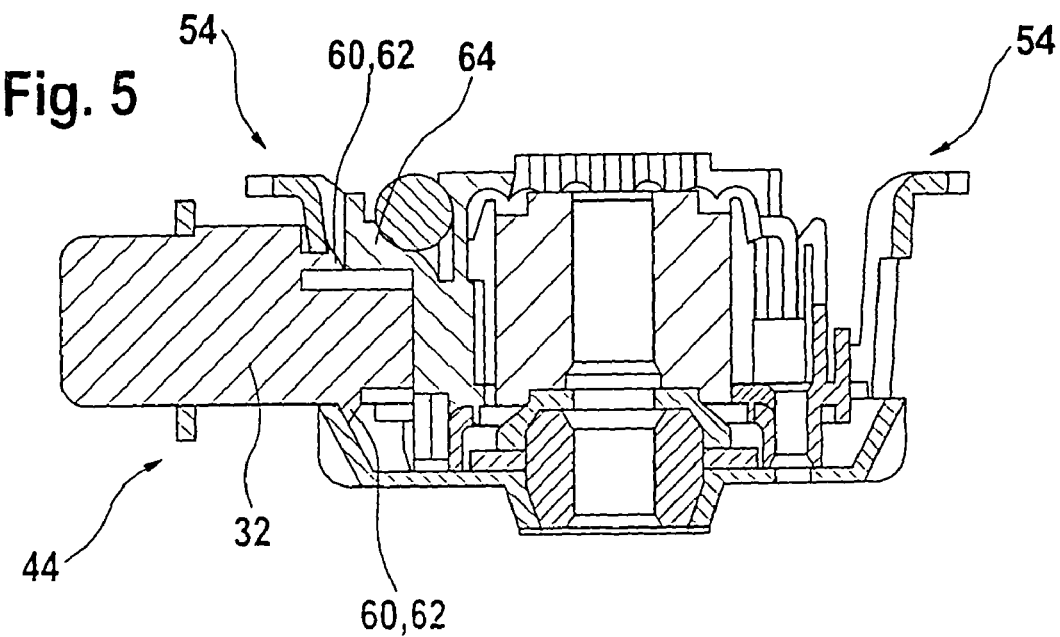
FIG. 5 shows a cross section of taken along line A-A' shown in FIG. 4.
Figure 6:
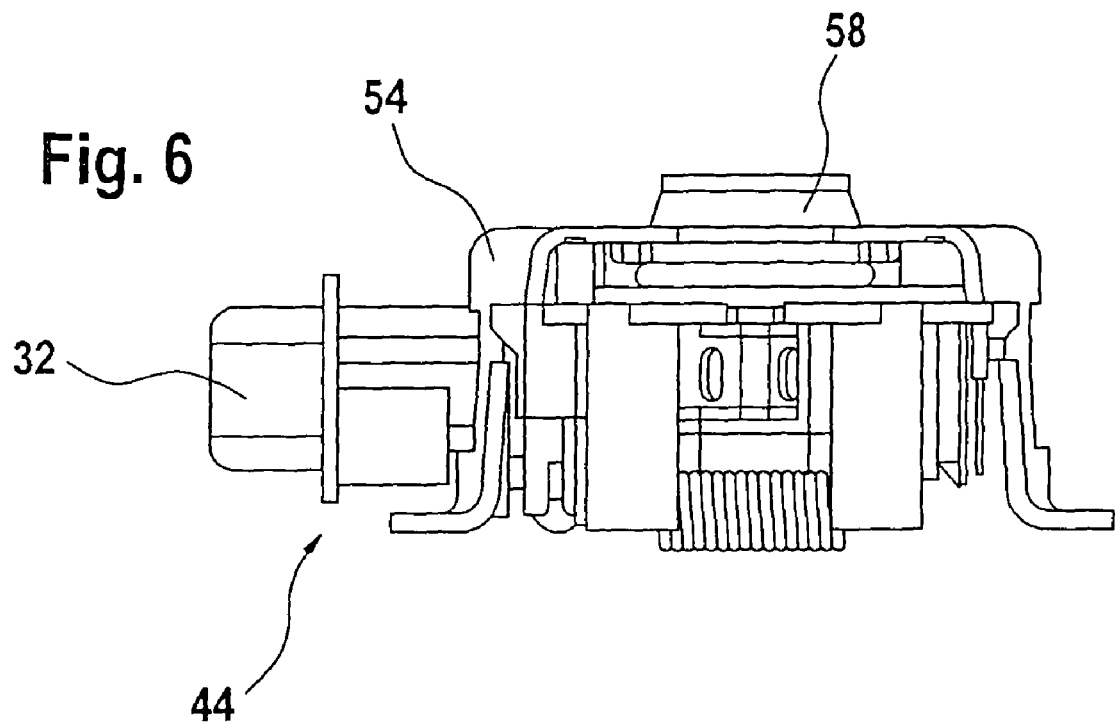
FIG. 6 shows a detail of a side view of an electric motor according to the present invention shown in FIG. 4.

FIG. 5 shows a sectional view taken along line A-A' shown in FIG. 4. The electrical connection means, which are designed as plug 30 in the exemplary embodiment shown in FIGS. 4 and 5, may be securely attached to the electric motor and, in particular, to bearing bracket 54 of the electric motor. For this purpose, plug 30 has latching tabs 62 which engage with bearing bracket 54 when the plug is inserted into the electric motor. Via latching elements 60, for example latching tabs 62 of the exemplary embodiment according to FIG. 5, and, if necessary, by joining plug 30 in a form-locking manner to plug socket 64 formed on the electric motor and serving as the plug receptacle, it is possible to attach the electrical connection means directly to the electric motor, without having to provide attachment means on motor housing 14.

Figure 7:
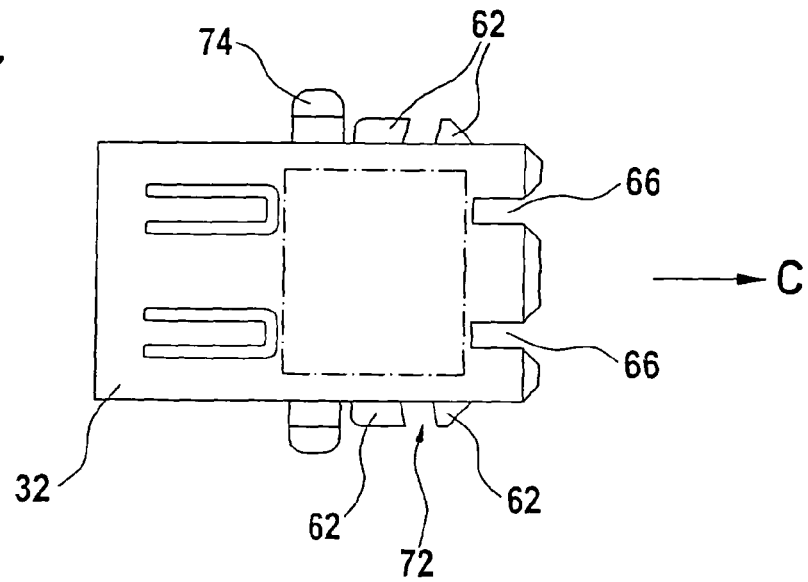
FIG. 7 shows a top view of an exemplary embodiment of a plug for an electric motor according to the present invention.
Figure 8:
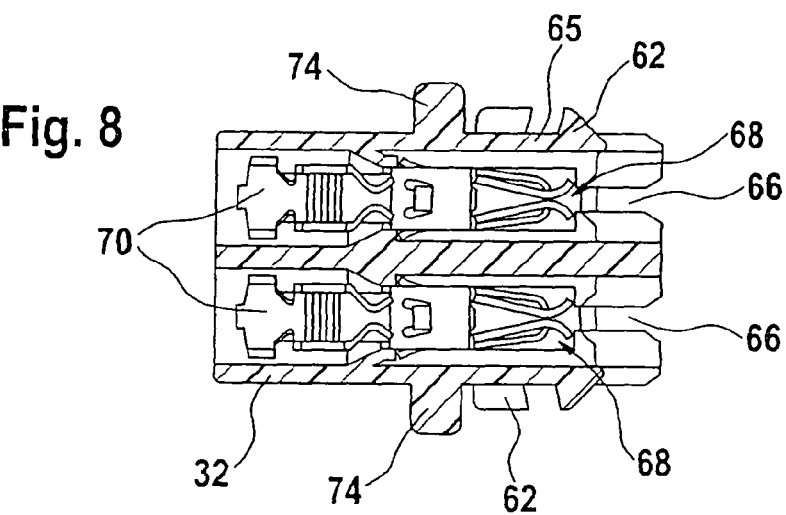
FIG. 8 shows a longitudinal section of the plug shown in FIG. 7.

FIGS. 7 and 8 show a first exemplary embodiment of a plug 32 of the electric motor according to the present invention. Plug 32 is inserted into a plug receptacle 64 of the electric motor in the direction of arrow C according to FIG. 7 for the purpose of electrical contacting of the electric motor. Contact pins provided in the plug receptacle engage with openings 66 provided in the plug and extend into the interior of the plug. As illustrated by the sectional view of plug 32 shown in FIG. 8, the contact pins are securely encompassed individually by contact springs 68 provided in the plug element, establishing an electrically conductive contact between the contact pins of the electric motor and terminals 70 of plug 32. If necessary, the plug is also connected to an electric power supply, e.g., the battery of a motor vehicle, via corresponding electric lines, which in the interest of clarity are not illustrated in FIG. 7 or FIG. 8, but are nevertheless contacted by terminals 70, a control unit being connected therebetween.

Plug 32 according to the exemplary embodiment shown in FIG. 7 or FIG. 8 has latching tabs 62 on its outer circumference which, in the manner described, enable plug 32 to be attached directly to the bearing bracket of the electric motor. When plug 32 is inserted into the plug receptacle, i.e., plug socket 62, bearing bracket 54 is thus positioned in intermediate area 72, which is produced between latching tabs 62 in the axial direction of the plug, i.e., in the direction of arrow C in FIG. 7. Bevels provided in or on latching tabs 62 enable the attachment of plug 32 to bearing bracket 54 to achieve a certain pre-tension.

If latching tabs 62 or a certain area of these latching tabs are designed as spring-elastic latching elements 65, as shown in the cross-sectional view of FIG. 8, the attachment of plug 32 to the electric motor may also be easily released. By applying pressure to pins 74 provided on spring-elastic latching elements 65, the latching elements may be pressed together so that they no longer engage with the bearing bracket, and plug 32 may be withdrawn from the plug receptacle.

Figure 9:
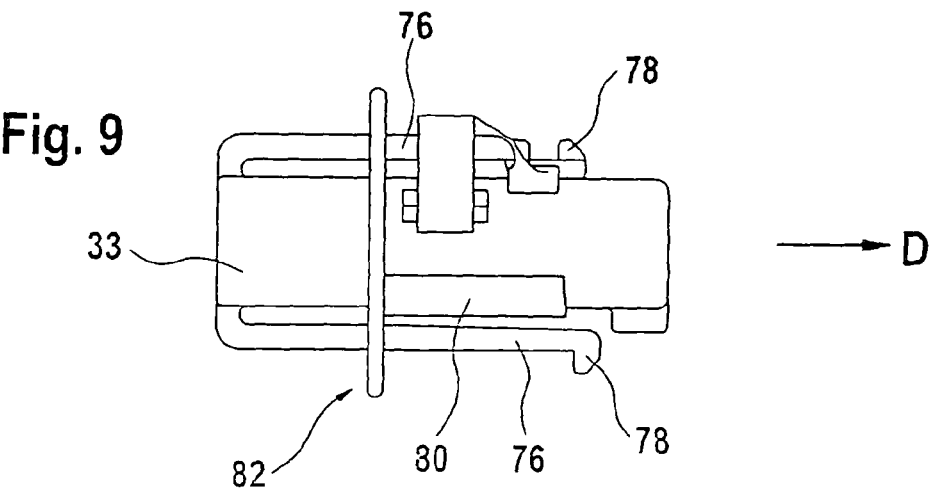
FIG. 9 shows a schematic representation of an alternative exemplary embodiment of a plug for the electric motor according to the present invention.

FIG. 9 shows an alternative exemplary embodiment of a plug 33 of the electrical connection means for the electric motor according to the present invention. Plug 33 is inserted in the direction of arrow D into a corresponding plug receptacle provided on the electric motor and contacted by the contact pins of the electric motor. Plug 33 according to FIG. 9 has at least two attachment means designed as spring-elastic latching hooks 76 on its outer circumference. When plug 33 is inserted into the plug receptacle of the electric motor, latching tabs 78 of spring-elastic latching hooks 76 engage according to the present invention with a bearing bracket of the electric motor. Since plug 33 is supported on the outside of the bearing bracket by a supporting element 80, the electrical connection means in the form of plug 33 are securely attachable to the electric motor. Plug 33 is encompassed in the radial direction by a plate-shaped collar 82, and this plate-shaped collar seals the opening in the receiving housing of the electric motor through which the electrical connection means are inserted to the extent possible and in a manner similar to collar 44 of plug 32. Care must be taken to prevent a vibration bridge from forming between plug 33 or 32 contacted by the electric motor and the motor housing, as also illustrated, for example, in FIG. 1.

Figure 10:
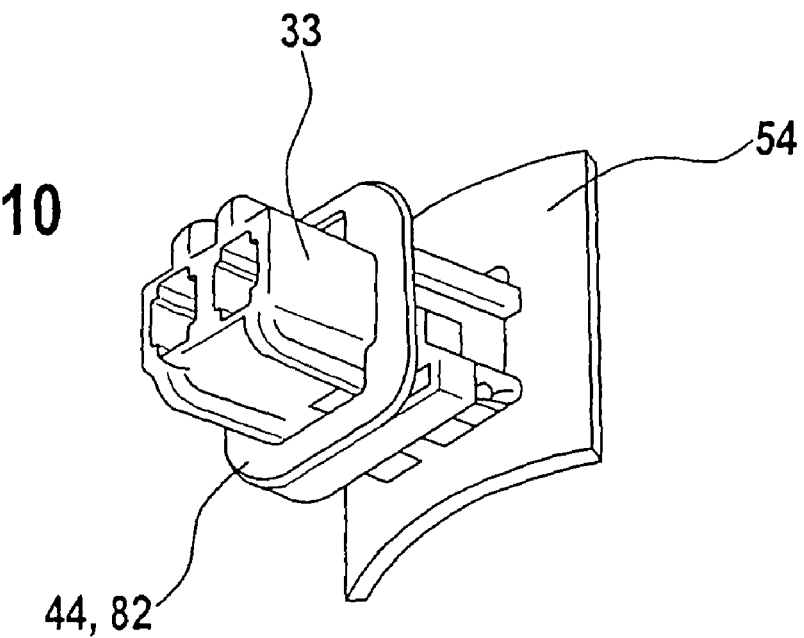
FIG. 10 shows a detailed representation of a plug according to FIG. 9, inserted into the electric motor.

FIG. 10 shows a detailed view of plug 33 inserted into the plug receptacle and supported on bearing bracket 54.

The electric motor according to the present invention and the attachment of the electrical connection means directly and exclusively to the motor advantageously reduce the transmission of vibrations from the motor to the motor housing and thus to the air conditioning system. Latching the plug directly to the motor interrupts the vibration bridge between the driving electric motor and the motor mount and prevents the operating vibrations of the motor/plug unit from being transmitted to the air conditioner housing. In particular, the motor is latched directly to the bearing bracket to establish a mechanically secure connection between the motor and the plug. Via this latching system, the motor design itself may remain largely unchanged, since no additional attachment measures are needed, and a mechanically secure connection is nevertheless established. It is especially advantageous to provide at least a dual plug latching system to absorb the extraction forces of the electrical connection means.

The electric motor according to the present invention is not limited to the exemplary embodiments illustrated in the drawing. For example, the electric motor according to the present invention is not limited to the special embodiments of the latching means.

What is claimed is:

1. An electric motor system for an air conditioning fan of a motor vehicle, comprising:
   an electric motor;
   a motor housing for the electric motor, wherein the motor housing includes a receiving opening into which the electric motor at least partially extends;
   at least one electrical connection element for supplying power to the electric motor; and
   an attachment unit for the at least one electrical connection element, wherein the at least one electrical connection element is attached to the electric motor;
   wherein the motor housing includes an electrical connection element opening;
   wherein a portion of the electrical connection element is situated in the electrical connection element opening;
   wherein the electrical connection element includes a plate-shaped collar that covers the electrical connection element opening from outside of the motor housing, such that a vertical projection of the plate-shaped collar onto an outer surface of the motor housing completely encompasses the electrical connection element opening; and
   wherein the electrical connection element is not in physical contact with the motor housing.

2. The electric motor system as recited in claim 1, wherein the at least one electrical connection element is attached to the electric motor, without the use of the attachment unit on the motor housing.

3. The electric motor system as recited in claim 2, wherein the at least one electrical connection element includes a plug and a plug receptacle, wherein the plug receptacle is formed on the electric motor.

4. The electric motor system as recited in claim 3, wherein the plug receptacle is formed in an area of a bearing bracket of the electric motor.

5. The electric motor system as recited in claim 1, wherein the at least one electrical connection element includes a plug and a plug receptacle for contacting the electric motor, and wherein the plug is configured to be attached to the electric motor.

6. The electric motor system as recited in claim 5, wherein the plug is configured to be latched to the electric motor for secure contacting.

7. The electric motor system as recited in claim 1, wherein the at least one electrical connection element includes a plug and a plug receptacle, wherein the plug is configured to be latched to the electric motor for secure contacting of the electric motor without using a separate latching system on the motor housing.

8. The electric motor system as recited in claim 6, wherein the plug includes at least one spring-elastic latching element for secure contacting.

9. The electric motor system as recited in claim 7, wherein the plug includes at least one spring-elastic latching element for secure contacting.

10. The electric motor system as recited in claim 8, wherein the at least one spring-elastic latching element includes at least two latching hooks.

11. The electric motor system as recited in claim 9, wherein the at least one spring-elastic latching element includes at least two latching hooks.

12. The electric motor system as recited in claim 7, wherein the plug is configured to be latched to a bearing bracket of a shaft of the electric motor.

13. The electric motor system as recited in claim 8, wherein the plug is configured to be latched to a bearing bracket of a shaft of the electric motor.

* * * * *